(12) United States Patent
Michener

(10) Patent No.: US 6,744,789 B1
(45) Date of Patent: Jun. 1, 2004

(54) SYSTEM AND METHOD FOR TRANSLATING MPEG PACKETS WHICH INCLUDE PCR DATA INTO DIRECTV PACKETS WHICH INCLUDE RTS DATA

(75) Inventor: James A. Michener, Grass Valley, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 716 days.

(21) Appl. No.: 09/669,140

(22) Filed: Sep. 26, 2000

(51) Int. Cl.[7] .............................. H04J 3/06; H04J 3/24
(52) U.S. Cl. ...................................... 370/509; 370/474
(58) Field of Search ................................ 370/310, 315, 370/316, 325, 326, 464–66, 469–476, 503, 506, 509, 510, 512, 513, 514, 520; 455/12.1, 13.1, 13.2, 13.3; 725/63–68, 119

(56) References Cited

U.S. PATENT DOCUMENTS

| | | | |
|---|---|---|---|
| 6,433,831 B1 * | 8/2002 | Dinwiddie et al. | 348/553 |
| 6,516,467 B1 * | 2/2003 | Schindler et al. | 725/153 |
| 6,538,656 B1 * | 3/2003 | Cheung et al. | 345/519 |
| 6,573,905 B1 * | 6/2003 | MacInnis et al. | 345/629 |
| 6,636,222 B1 * | 10/2003 | Valmiki et al. | 345/505 |
| 6,661,422 B1 * | 12/2003 | Valmiki et al. | 345/530 |
| 2003/0189571 A1 * | 10/2003 | MacInnis et al. | 345/505 |

* cited by examiner

*Primary Examiner*—David Vincent
(74) *Attorney, Agent, or Firm*—John A. Crook; Georgann S. Grunebach

(57) ABSTRACT

A method, apparatus, article of manufacture, and a memory structure for translating an input data packet from an input format to at least one output data packet in an output format. The method comprises the steps of reading a series of data packets in the input format, the data packets including a data type identifier, wherein at least some of the data packets include first time synchronization data and at least some of the data packets include payload data; identifying data packets of interest in the series of data packets according to data type using the data type identifier; identifying data packets from the data packets of interest having time synchronization information; generating second time synchronization information from the first time synchronization information for the data packets having time synchronization information, and generating at least one output data packet in the output data format having the second time synchronization information. In one embodiment, the method further comprises the steps of identifying data packets from the data packets of interest having payload data, and assembling at least one output data packet in the second format having the payload data.

52 Claims, 11 Drawing Sheets

SYSTEM AND METHOD FOR TRANSLATING MPEG PACKETS WHICH INCLUDE PCR DATA INTO DIRECTV PACKETS WHICH INCLUDE RTS DATA

BACKGROUND OF THE INVENTION

1. Field of the Invention

The present invention relates to systems and methods for the translation and presentation of digital data, and in particular, to a method and apparatus for translating an input data packet from a first input format to a second format.

2. Description of the Related Art

Television programs are distributed to viewers by a variety of broadcasting methods. These methods include traditional analog broadcast television (National Television Systems Committee or "NTSC" standard), the upcoming digital broadcast television (Advanced Television Systems Committee or "ATSC" standard), cable television (both analog and digital), satellite broadcasting (both analog and digital), as well as other methods. These methods allow channels of television content to be multiplexed and transmitted over a common transmission medium. Typically, the program material and supporting data such as program guides are transmitted as packetized data in a time-division multiple access (TDMA) channel scheme. Typically, the data packets containing program material are compressed to reduce their size.

High definition television (HDTV) improves substantially upon the image and audio quality of basic broadcast television. However, uncompressed HDTV signals include much more information (typically well over a gigabit per second). When transmitted, even highly compressed HDTV signals require significantly more bandwidth than standard video.

Since the advent of satellite-broadcast television, the advanced television systems committee (ATSC) prepared, and the Federal Communications Commission (FCC) adopted a standard protocol for terrestrial high definition broadcasts. This standard was based on protocols developed by the motion picture experts group (MPEG)—specifically, MPEG-2 video on MPEG-2 transport.

In the early market penetration phases of HDTV, the cost to transmit uncompressed HDTV via satellite or terrestrial fiber optic circuits are not justified by the relatively small audience. Standard definition television (SDTV) signals having a lower bandwidth and a higher audience are often distributed in a "contribution quality", a quality higher than normal transmission permitting alteration of the signal by affiliates. HDTV, which is in an early stage of development, is typically distributed in a format fully compressed and ready for broadcast "broadcast quality". These signals are reduced in bandwidth to less than 18.5 megabits per second in a format directly compatible and ready for ATSC broadcast.

Without translation, the satellite broadcasters would have to fully decode the ATSC signal into an uncompressed digital stream, then re-encode the stream into the proper format and protocol. Unfortunately, this solution is undesirable, for several reasons. First, the decode/recode process induces errors, resulting in degradation of the output signal. Second, to minimize the reduction in the quality of the recoded signal, the bit rate of the second encode cycle may be larger than the original coding rate, thus increasing bandwidth. The reduction in signal quality is worse than one might assume. One of the most difficult tasks for an MPEG encoder is to code an MPEG artifact. Consequently, if difficulties in the first encoding process result in artifacts, these artifacts will cause even greater difficulties in the next encoding process. Third, the decode/recode process requires relatively expensive decoder/encoder hardware. What is needed is a method and apparatus for translating input data packets from a first protocol to a second protocol, without losing signal quality or requiring additional bandwidth or hardware. The present invention satisfies that need.

SUMMARY OF THE INVENTION

To address the requirements described above, the present invention discloses a method, apparatus, and article of manufacture for translating an input data packet from an input format to at least one output data packet in an output format. The method comprises the steps of reading a series of data packets in the first format, the data packets including a data type identifier, wherein at least some of the data packets include first time synchronization data and at least some of the data packets include payload data; identifying data packets of interest in the series of data packets according to data type using the data type identifier; identifying data packets from the data packets of interest having time synchronization information; generating second time synchronization information from the first time synchronization information for the data packets having time synchronization information, and generating at least one output data packet in the output data format having the second time synchronization information. In one embodiment, the method further comprises the steps of identifying data packets from the data packets of interest having payload data, and assembling at least one output data packet in the second format having the payload data.

The apparatus comprises a receiver for accepting the series of data packets in the first format, the data packets including a data type identifier, wherein at least some of the data packets include first time synchronization data and at least some of the data packets include payload data; a translator, comprising a processor, communicatively coupled to the receiver, the processor for performing instructions; a memory, communicatively coupled to the processor, the memory storing instructions comprising a first instruction set to identify data packets of interest in the series of data packets according to the data type identifier, a second instruction set to identify data packets from the data packets of interest having time synchronization information, a third instruction set to generate second time synchronization information from the first time synchronization information for the data packets having first time synchronization information and a fourth instruction set to generate at least one output data packet in the second format having the second time synchronization information.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
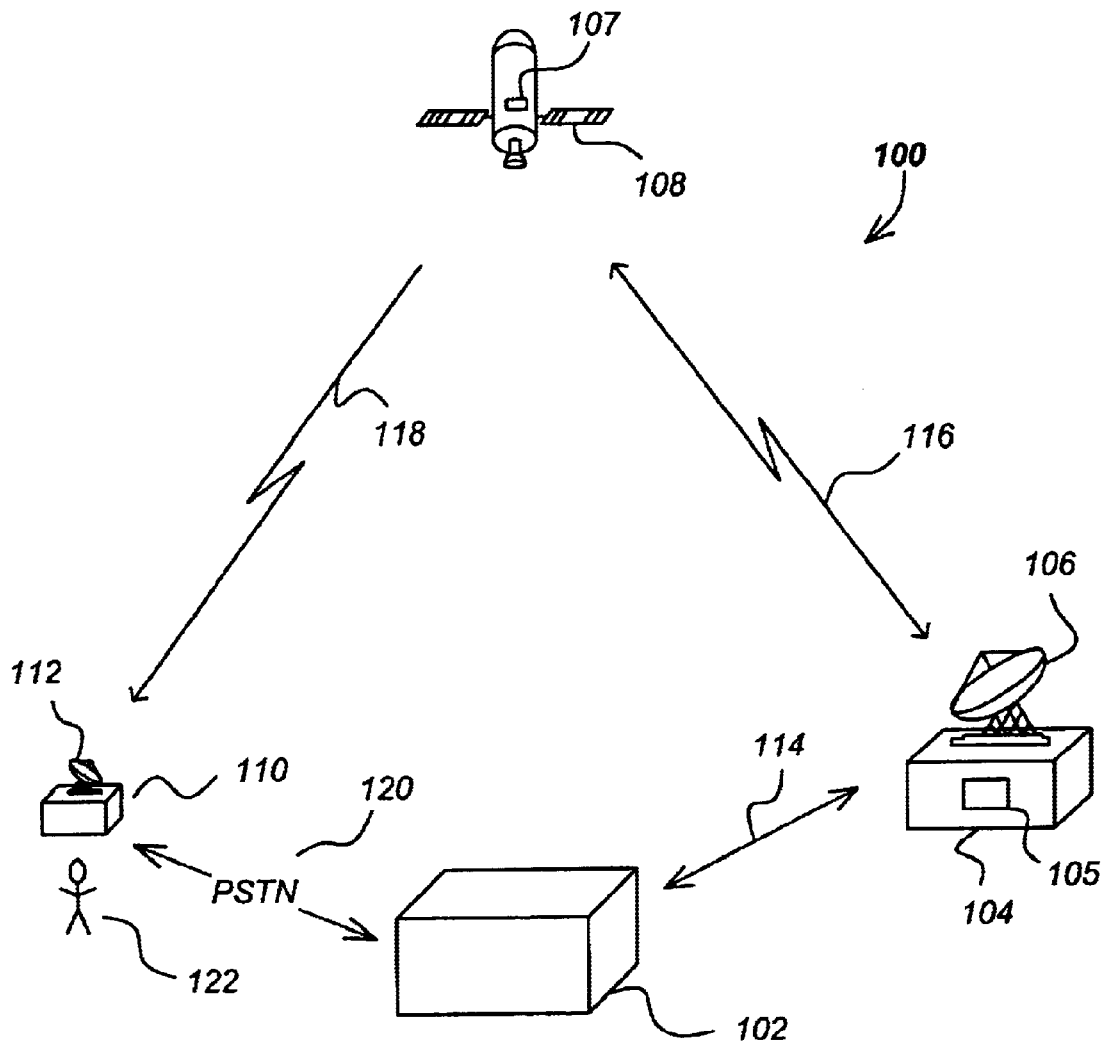
FIG. 1 is a diagram showing an overview of a video distribution system.

FIG. 1 is a diagram illustrating an overview of a single satellite video distribution system 100. The video distribution system 100 comprises a control center 102 in communication with an uplink center 104 via a ground link 114 and with a subscriber receiver station 110 via a public switched telephone network (PSTN) or other link 120. The control center 102 provides program material (e.g. video programs, audio programs and data) to the uplink center 104, coordinates with the subscriber receiver stations 110 to offer pay-per-view (PPV) program services, including billing and associated decryption of video programs.

The uplink center receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using transmitter 107. The subscriber receiving station 110 receives this information using the outdoor unit (ODU), which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. However, using data compression and multiplexing techniques the channel capabilities are far greater. For example, two satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well.

Uplink Configuration

Figure 2:
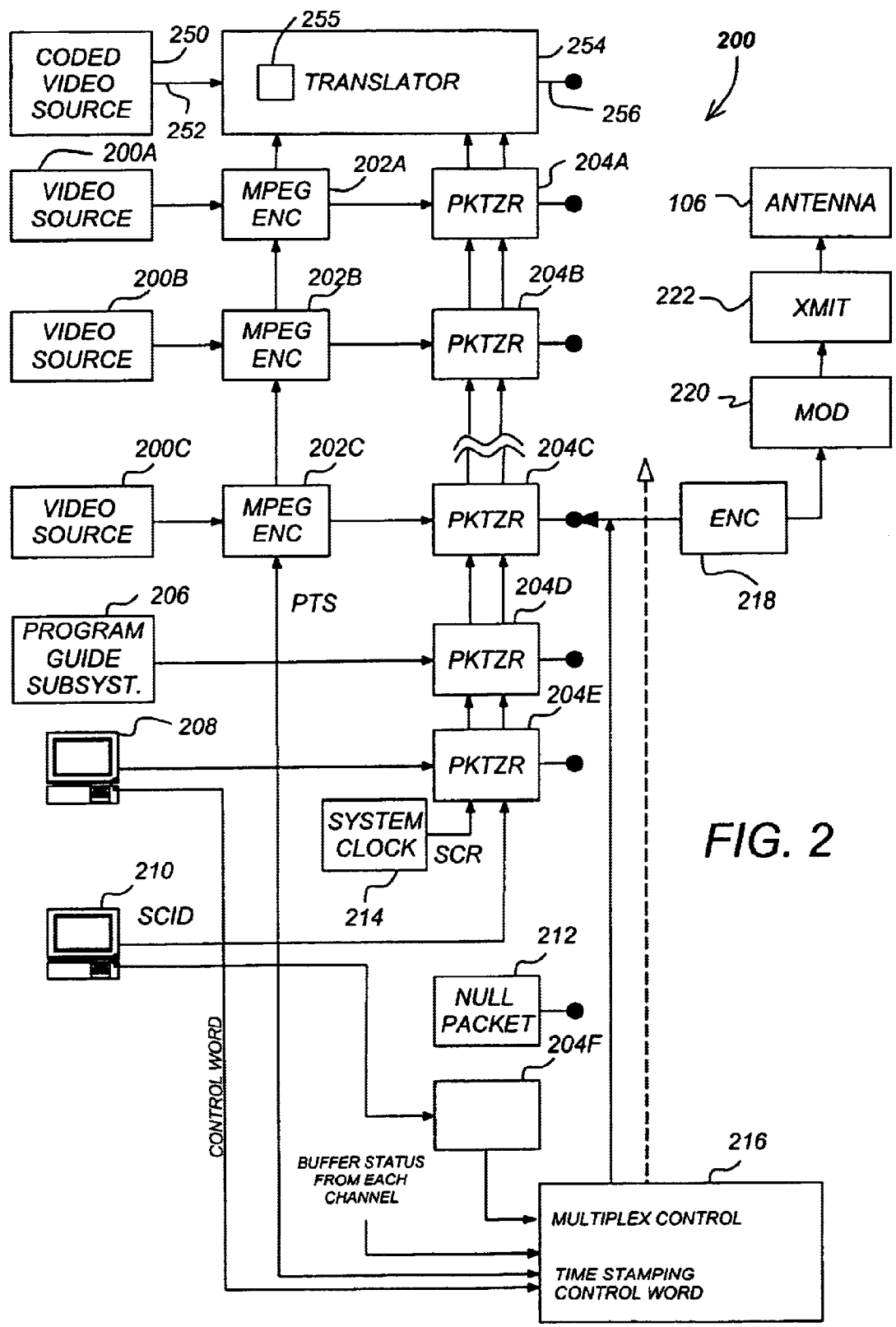
FIG. 2 is a block diagram showing a typical uplink configuration showing how video program material is uplinked to a satellite for transmission to subscribers using a single transponder.

FIG. 2 is a block diagram showing a typical uplink configuration 200 for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a program guide subsystem 206.

The video channels are provided by a program source of video material 200A–200C (collectively referred to hereinafter as video source(s) 200). The data from each video program source 200 is provided to an encoder 202A–202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other encoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizers 204A–204F (collectively referred to hereinafter as packetizer(s) 204) associated with each source 200.

The data packets are assembled using a reference from the system clock 214 (SCR), and from the conditional access manager 208, which provides the SCID to the packetizers 204 for use in generating the data packets. These data packets are then multiplexed into serial data, modulated, and transmitted by the encoder 218, modulator 220, transmitter 222 and antenna 106.

The uplink configuration 200 may also include a coded program source 250. The coded program source 250 provides a signal 252 having video and/or audio information that has already been coded in a particular format (e.g. protocol and/or syntax). In on example, the coded video source 250 provides video and/or audio information coded in a series of input data packets according to MPEG-2 and the ATSC HDTV standard. The signal 252 provided by the coded video source, however could be any packetized data transmitted via an asynchronous serial interface (ASI).

The coded video can be configured in the same format as the signals available at the output of packetizers 204 by decoding the coded video (using, for example, an MPEG-2 decoder) to yield uncoded data, recoding the data with an encoder similar to encoders 202, and packetizing the encoded data with a packetizer 204. However, such transformation requires additional expensive coding and decoding hardware/software, and can result in unacceptable artifacts. Hence, the present invention includes a translator 254, communicatively coupled to the coded video source 250. The translator 254 accepts the input data packets in the signal 252 via a receiver 255 and translates the signal 252 to produce a second signal 256 having output data packets of a different packetized format. The translator 254 may include a receiver for accepting a data packets from a transmitter or other program In the illustrated embodiment, the packetized format of the second signal 256 is the same as that which is present at the output of packetizers 204.

Broadcast Data Stream Format and Protocol

Figure 3A:
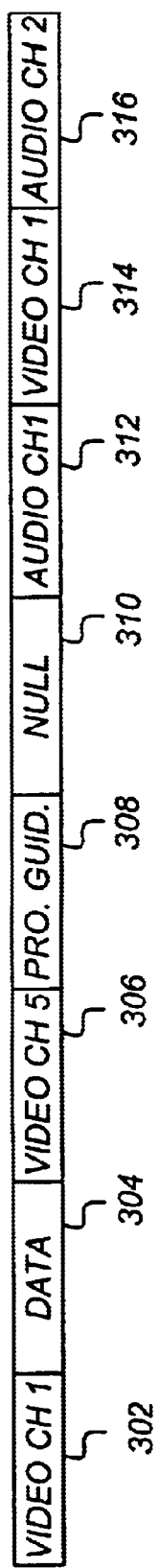
FIG. 3A is a diagram of a representative data stream received from a satellite.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment includes information from video channel 1 (again, coming from the first video program source 200A). The next packet segment 308 comprises program guide information such as the information provided by the program guide subsystem 206.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 400 receives these signals, and using the SCID, reassembles the packets to regenerate the program material for each of the channels. As shown in FIG. 3A, null packets created by the null packet module 212 may be inserted into the data stream as desired.

Figure 3B:
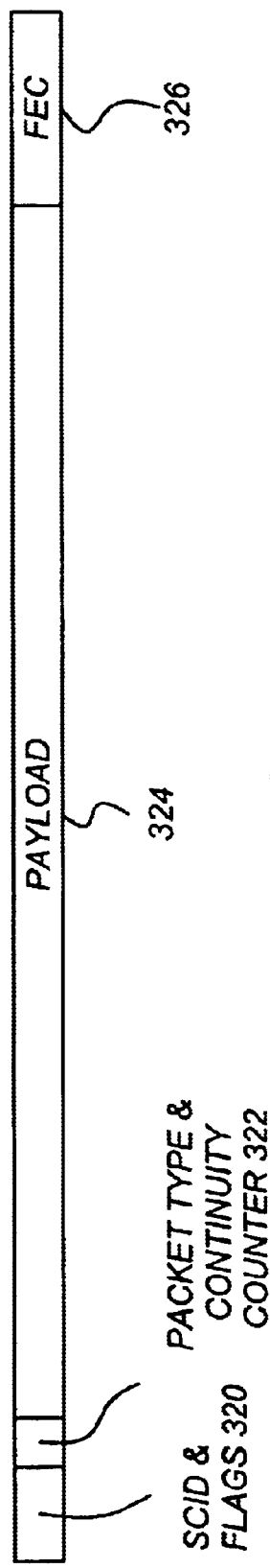
FIG. 3B is a diagram illustrating the structure of a data packet.

FIG. 3B is a diagram of a data packet. In this illustrated embodiment, each data packet (e.g. 302–316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 200. The final packet segment 326 is data required to perform forward error correction.

Integrated Receiver/Decoder

Figure 4:
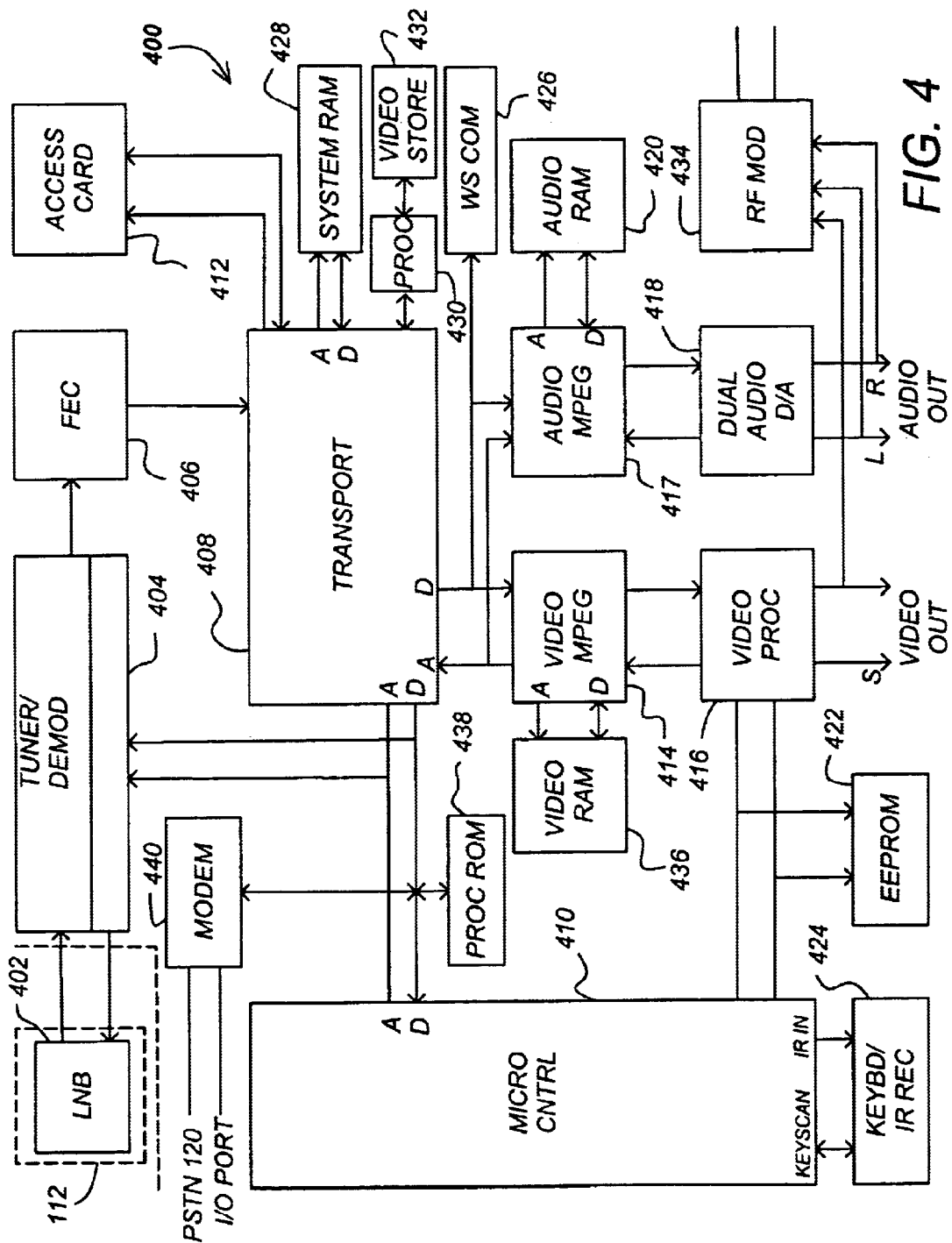
FIG. 4 is a block diagram of one embodiment of an integrated receiver/decoder.

FIG. 4 is a block diagram of an integrated receiver/decoder (IRD) 400 (also hereinafter alternatively referred to as receiver 400). The receiver 400 comprises a tuner/demodulator 404 communicatively coupled to an ODU 112 having one or more LNBs 402. The LNB 402 converts the 12.2– to 12.7 GHz downlink 118 signal from the satellites 108 to, e.g., a 950–1450 MHz signal required by the IRD's 400 tuner/demodulator 404. The LNB 402 may provide either a dual or a single output. The single-output LNB 402 has only one RF connector, while the dual output LNB 402 has two RF output connectors and can be used to feed a second receiver or some other form of distribution system.

The tuner/demodulator 404 isolates a single, digitally modulated 24 MHz transponder, and converts the modulated data to a digital data stream. The digital data stream is then supplied to a forward error correction (FEC) decoder 406. This allows the IRD 400 to reassemble the data transmitted by the uplink center 104 (which applied the forward error correction to the desired signal before transmission to the subscriber receiving station 110) verify that the correct data signal was received, and correct errors, if any. The error-corrected data may be fed from the FEC decoder module 506 to the transport module via an 8-bit parallel interface.

The transport module 408 performs many of the data processing functions performed by the IRD 400. The transport module 408 processes data received from the FEC decoder module 406 and provides the processed data to the video MPEG decoder 414 and the audio MPEG decoder 416. In one embodiment of the present invention, the transport module, video MPEG decoder and audio MPEG decoder are all implemented on integrated circuits. This design promotes both space and power efficiency, and increases the security of the functions performed within the transport module 408. The transport module 408 also provides a passage for communications between the microcontroller 410 and the video and audio MPEG decoders 414, 416. As set forth more fully hereinafter, the transport module also works with the conditional access module (CAM) 412 to determine whether the subscriber receiving station 110 is permitted to access certain program material. Data from the transport module can also be supplied to external communication module 426.

The CAM 412 functions in association with other elements to decode an encrypted signal from the transport module 408. The CAM 412 may also be used for tracking and billing these services. In one embodiment of the present invention, the access card is a smart card, having contacts cooperatively interacting with contacts in the IRD 400 to pass information. In order to implement the processing performed in the CAM 412, the IRD 400, and specifically the transport module 408 provides a clock signal to the CAM 412.

Video data is processed by the MPEG video decoder 414. Using the video random access memory (RAM) 436, the MPEG video decoder 414 decodes the compressed video data and sends it to an encoder or video processor 416, which converts the digital video information received from the video MPEG module 414 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if ATSC high definition programming is processed.

Audio data is likewise decoded by the MPEG audio decoder 417. The decoded audio data may then be sent to a digital to analog (D/A) converter 418. In one embodiment of the present invention, the D/A converter 418 is a dual D/A converter, one for the right and left channels. If desired, additional channels can be added for use in surround sound processing or secondary audio programs (SAPs). In one embodiment of the invention, the dual D/A converter 418 itself separates the left and right channel information, as well as any additional channel information. Other audio formats may similarly be supported. For example multi-channel digital audio formats, such as DOLBY DIGITAL AC-3.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

Microcontroller 410 receives and processes command signals from the remote control 424, an IRD 400 keyboard interface, and/or another input device. The microcontroller receives commands for performing its operations from a processor programming memory, which permanently stores such instructions for performing such commands. The processor programming memory may comprise a read only memory (ROM) 438, an electrically erasable programmable read only memory (EEPROM) 422 or, similar memory device. The microcontroller 410 also controls the other digital devices of the IRD 400 via address and data lines (denoted "A" and "D" respectively, in FIG. 5).

The modem 440 connects to the customer's phone line via the PSTN port 120. It calls, e.g. the program provider, and transmits the customer's program purchases for billing purposes, and/or other information. The modem 440 is controlled by the microprocessor 410. The modem 440 can output data to other I/O port types including standard parallel and serial computer I/O ports.

The present invention also comprises a local storage unit such as the video storage device 432 for storing video and/or audio data obtained from the transport module 408. Video storage device 432 can be a hard disk drive, a read/writable compact disc of DVD, a solid state RAM, or any other storage medium. In one embodiment of the present invention, the video storage device 432 is a hard disk drive with specialized parallel read/write capability so that data may be read from the video storage device 432 and written to the device 432 at the same time. To accomplish this feat, additional buffer memory accessible by the video storage 432 or its controller may be used. Optionally, a video storage processor 430 can be used to manage the storage and retrieval of the video data from the video storage device 432. The video storage processor 430 may also comprise memory for buffering data passing into and out of the video storage device 432. Alternatively or in combination with the foregoing, a plurality of video storage devices 432 can be used. Also alternatively or in combination with the foregoing, the microcontroller 410 can also perform the operations required to store and or retrieve video and other data in the video storage device 432.

The video processing module 416 output can be directly supplied as a video output to a viewing device such as a video or computer monitor. In addition, the video and/or audio outputs can be supplied to an RF modulator 434 to produce an RF output and/or 8 vestigal side band (VSB) suitable as an input signal to a conventional television tuner. This allows the receiver 400 to operate with televisions without a video output.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the IRD 400 also receives and stores a program guide in a memory available to the microcontroller 410. Typically, the program guide is received in one or more data packets in the data stream from the satellite 108. The program guide can be accessed and searched by the execution of suitable operation steps implemented by the microcontroller 410 and stored in the processor ROM 438. The program guide may include data to map viewer channel numbers to satellite transponders and service channel identifications (SCIDs), and also provide TV program listing information to the subscriber 122 identifying program events.

The functionality implemented in the IRD 400 depicted in FIG. 4 can be implemented by one or more hardware modules, one or more software modules defining instructions performed by a processor, or a combination of both.

Figure 5:
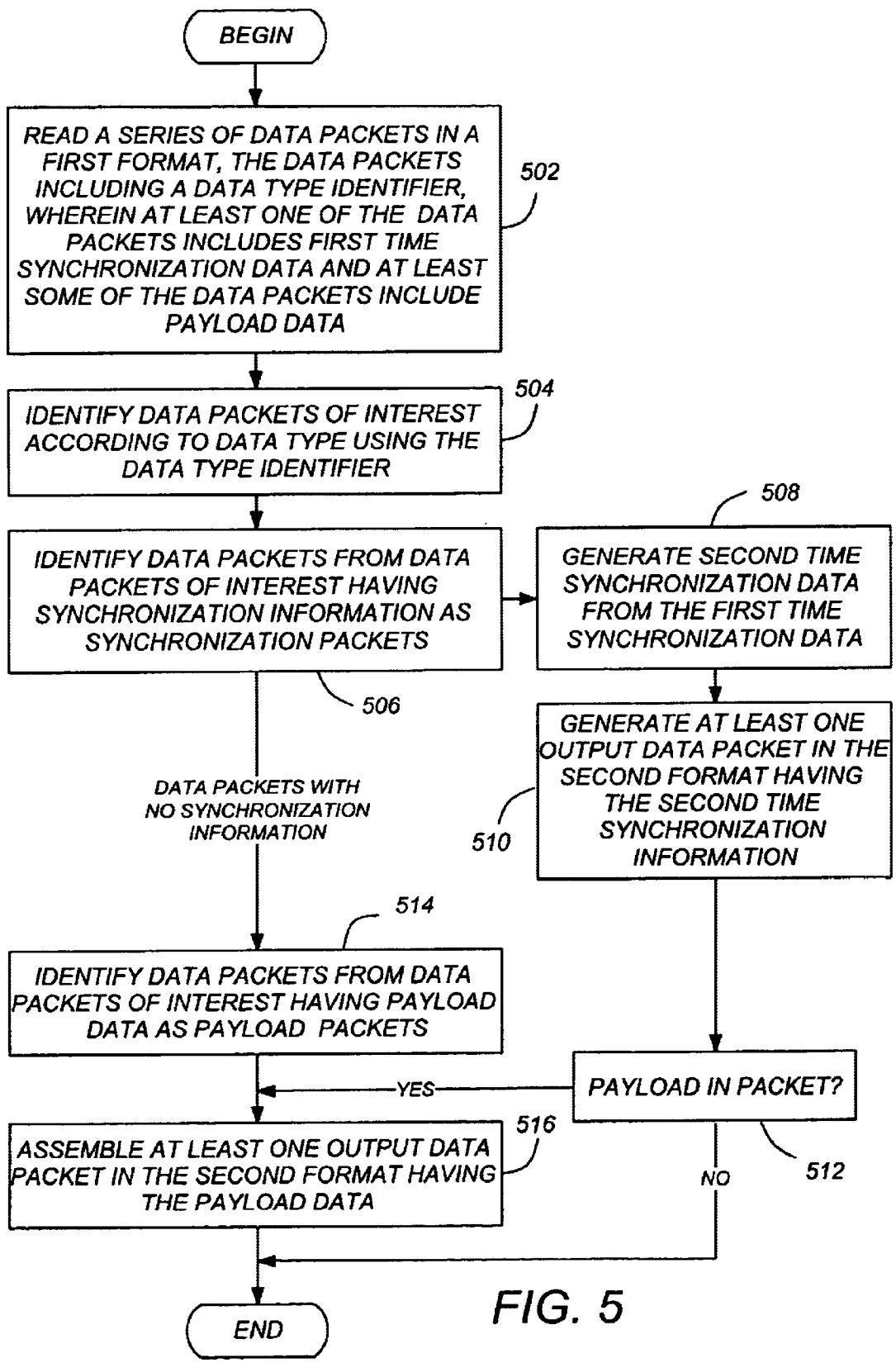
FIG. 5 is a flow chart illustrating one embodiment of the present invention.

FIG. 5 is a flow chart illustrating one embodiment of the present invention. A series of data packets complying with a first format (including transport and payload protocol, data definitions, etc.) are read, as shown in block 502. In one embodiment, the data packets include a data type identifier and at least one of the data packets includes first time synchronization information. At least some of the data packets also includes payload data. In one embodiment of the present invention, the data packets comply with the ATSC (MPEG-2 transport) high definition (HD) format.

Figure 6A:
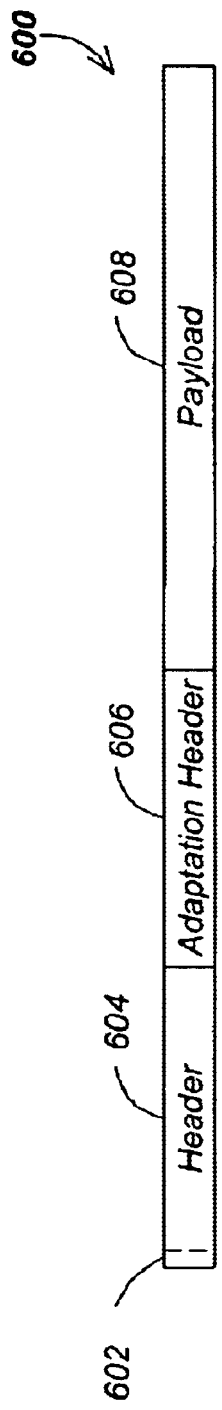
FIGS. 6A and 6B are diagrams illustrating the formation of a series of data packets that together for the first or input signal to the translator.
Figure 6B:
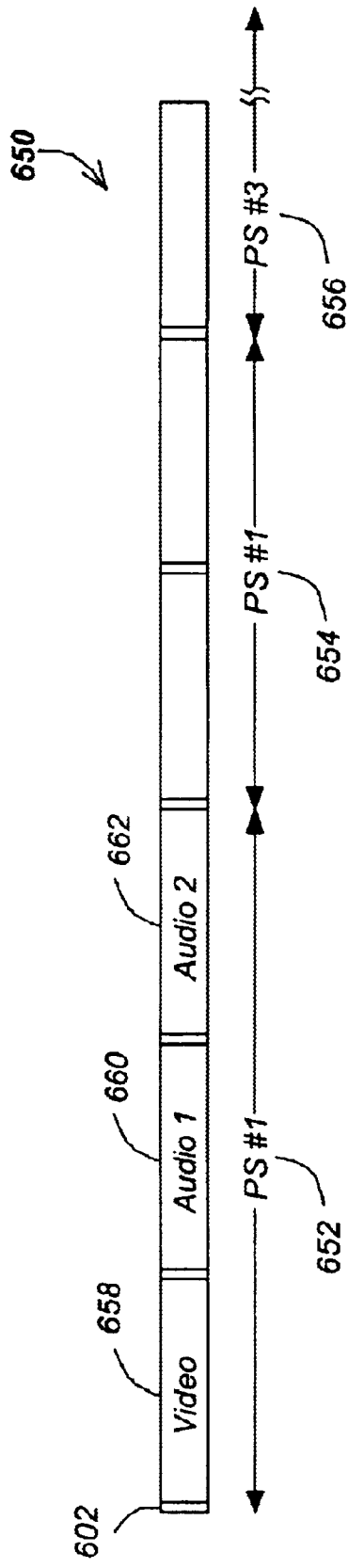

FIGS. 6A and 6B are diagrams illustrating the formation of a series of data packets that together form the first signal 252. In this example, the multiplex and transport characteristics of the first signal 252 are created via a fixed-length transport stream packetization approach based on a subset of the MPEG-2 transport system specification. Each data packet comprises only one type of data and can be identified by a packet ID header. This makes the transmission of new services (e.g. the broadcast distribution of software or high quality pictures) possible.

Elementary audio, video, and auxiliary data streams are packetized at an application encoding layer or a transport layer. The packetization can be application-dependent and results in elementary stream packets that can be of variable length.

Packetized elementary streams (PES) are then converted into fixed length 188-byte packets, each with a 4-byte header, before being fed to a transport layer. FIG. 6A is a diagram of a data packet 600 from an elementary stream. The data packet 600 includes a synchronization byte 602, a header 604, and adaptation header 606, and may include payload 608. Audio, video, and auxiliary PES packets are multiplexed together to constitute a program stream. The mix of these different packets can be dynamically allocated to meet the available channel bandwidth.

The transport layer provides the multiplexing and synchronization of the services (audio, video, and auxiliary) that comprise a program stream. An example of a transport stream 650 from the transport layer is presented in FIG. 6B. In the illustrated embodiment, the transport stream includes a first program stream 652, a second program stream 654 and a third program stream 656. The first program stream 652 includes a plurality of elementary stream data packets 600, such as video data packet 658, a first audio data packet 660, and a second audio data packet 662.

The syntax of the transport stream 650 is flexible enough to allow a program to be made up of a large number of elementary bit streams 600. Each transport packet header 604 includes at least one synchronization byte 602 and one or more flags for data stream content and program identification, as shown in FIG. 6B. The adaptation header 606 (which may be of variable length) which has additional information such as time and media synchronization, bit stream splice, and point flag information, may be included. The result is a first signal 252 that is a continuous MPEG-2

A conditional access mode capability, achieved by use of data packet scrambling, can be implemented in the transport stream with bits defined in the packet header. The transport syntax supports key encryption and descrambling functions, applicable to program streams or elementary streams.

Returning to FIG. 5, data packets 600 of interest are identified according to data type, as shown in block 504. Data packets 600 of interest are subject to additional data processing, while data packets which are not of interest, are simply ignored.

Figure 7:
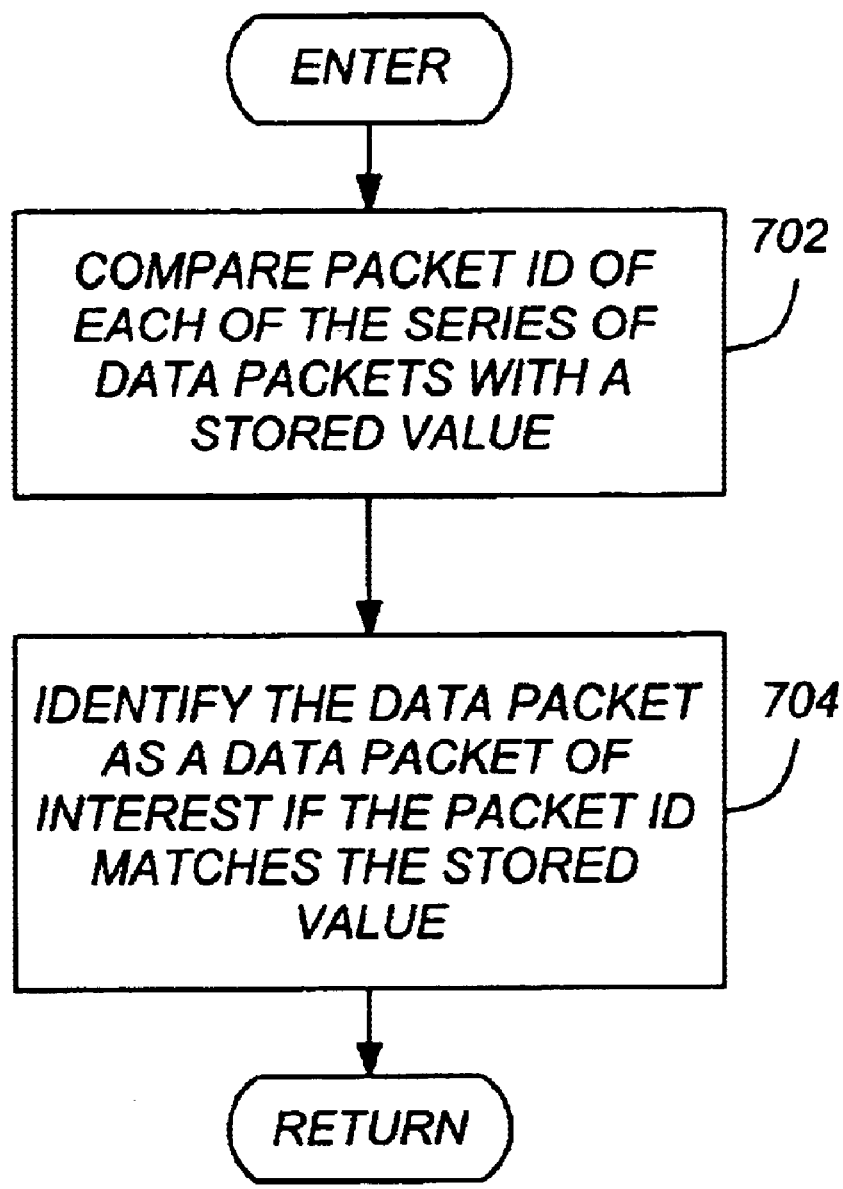
FIG. 7 is a flow chart illustrating one embodiment of the method steps used to identify packets of interest.

FIG. 7 is a flow chart illustrating one embodiment of the method steps used to identify data packets of interest. First, a packet ID in the header 604 of each packet in the series of data packets is compared with a stored value, as shown in block 702. Data packets of interest are then identified as those with a packet ID matching the stored value.

Returning to FIG. 5, data packets of interest having synchronization information are identified, as shown in block 506. Such data packets are hereinafter referred to as "synchronization packets", although such packets may also include payload data or other information. Synchronization packets trigger the generation of an output data packet in a second format, each with time synchronization information that has been properly translated. Synchronization packets, also include data. Data packets having no synchronization information are treated as having only payload data, and are processed by blocks 514 and 516 as discussed hereinafter.

In an embodiment of the invention relevant to the data streams presented in FIGS. 6A and 6B, data packets with synchronization information are identified as those packets with either a clock reference in the adaptation header (or field) 606, or data packets having a PES start code. In block 508, the synchronization information in the identified synchronization data packets is used to generate second time synchronization information.

Figure 8:
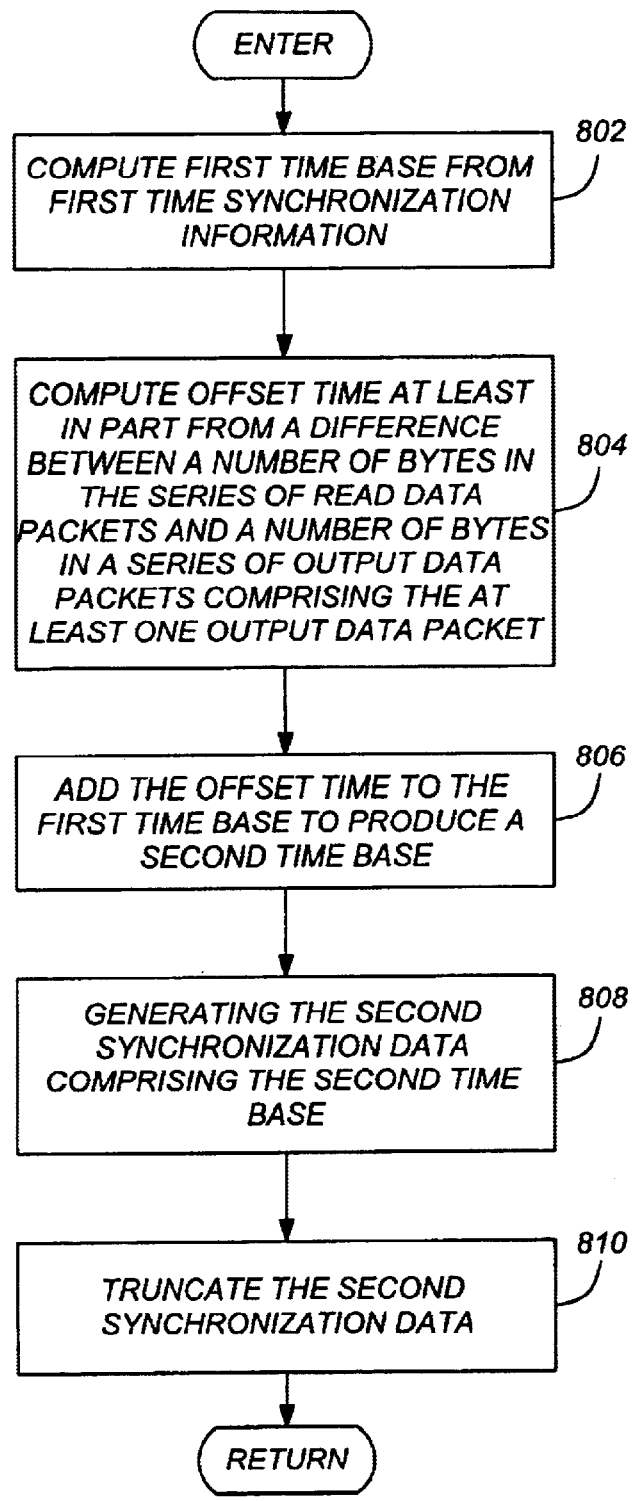
FIG. 8 is a flow chart illustrating exemplary method steps used to generate output data packet time synchronization information.

FIG. 8 is a flow chart showing exemplary method steps used to generate second time synchronization information from the first time synchronization information in the incoming data packets.

A first time base is computed from the first time synchronization information, as shown in block 802. The time base essentially describes a moment in time relative to other data packets that allows the data packets to be reassembled in order so that the program material may be viewed.

For exemplary purposes, consider the case of translating an input signal 252 from an MPEG-2 format to DIRECTV transport format. In the MPEG-2 format, the first time synchronization information includes a program clock reference (PCR) that is within the adaptation field 606. In the DIRECTV transport format, the time synchronization information is included in a Reference Time Stamp (RTS) value that is included in an Aux packet. Unlike MPEG-2 packets, which can include both synchronization information and payload data, DIRECTV compliant packets with synchronization data include no data. If the MPEG-2 compliant data packet has an adaptation field 606, but no PCR in the adaptation field 606, the adaptation field 606 and the data within it are simply discarded. If the adaptation field 606 includes a PCR, the information in the PCR is used to compute time synchronization information, which will be included in the Aux packet.

The PCR includes a first component (hereinafter referred to as PCR1) which is typically a 34-bit number based on a 90 MHz clock and a second component (hereinafter referred to as PCR2) based on a 27 MHz clock. The first time base can be computed from the PCR as $$\text{First time base} = (PCR1 \times 300) + PCR2 \quad \text{(Equation 1)}$$

This time base must be translated into a second time base, which is suitable for the second signal 256. The second time base can be based on a time clock and has a lower or higher rollover time than the first time base.

In the MPEG-2 to DIRECTV example described above, the format of the first signal 252 is described by a PCR (which has a rollover time of approximately 2 days), and the format of the second signal 256 is described by a proprietary DIRECTV transport protocol in which is based on a 32-bit 27 MHz time clock reference (which has a rollover time of about 2 minutes). In this case, the second time base is computed by dividing the result of Equation (1) by 27 MHz and returning only the 32 least significant bits of information. This computation translates the time synchronization information from the first data format to the second data format.

However, this computation fails to take into account data rate differences between the input data stream 252 and the output data stream 256 from the translator 254. The present invention accounts for these differences in two ways. First, when the output data rate exceeds the input data rate, coarse timing adjustments can be made by the insertion of null packets. Second, the time base used in translating the data packets from a first format to a second format is modified so that the output time synchronization information remains consistent.

Hence, an offset time is computed at least in part from the difference between the number of bytes in the series of read data packets and a number of bytes in a series of output data packets. This is illustrated in block 804 of FIG. 8.

Figure 9:
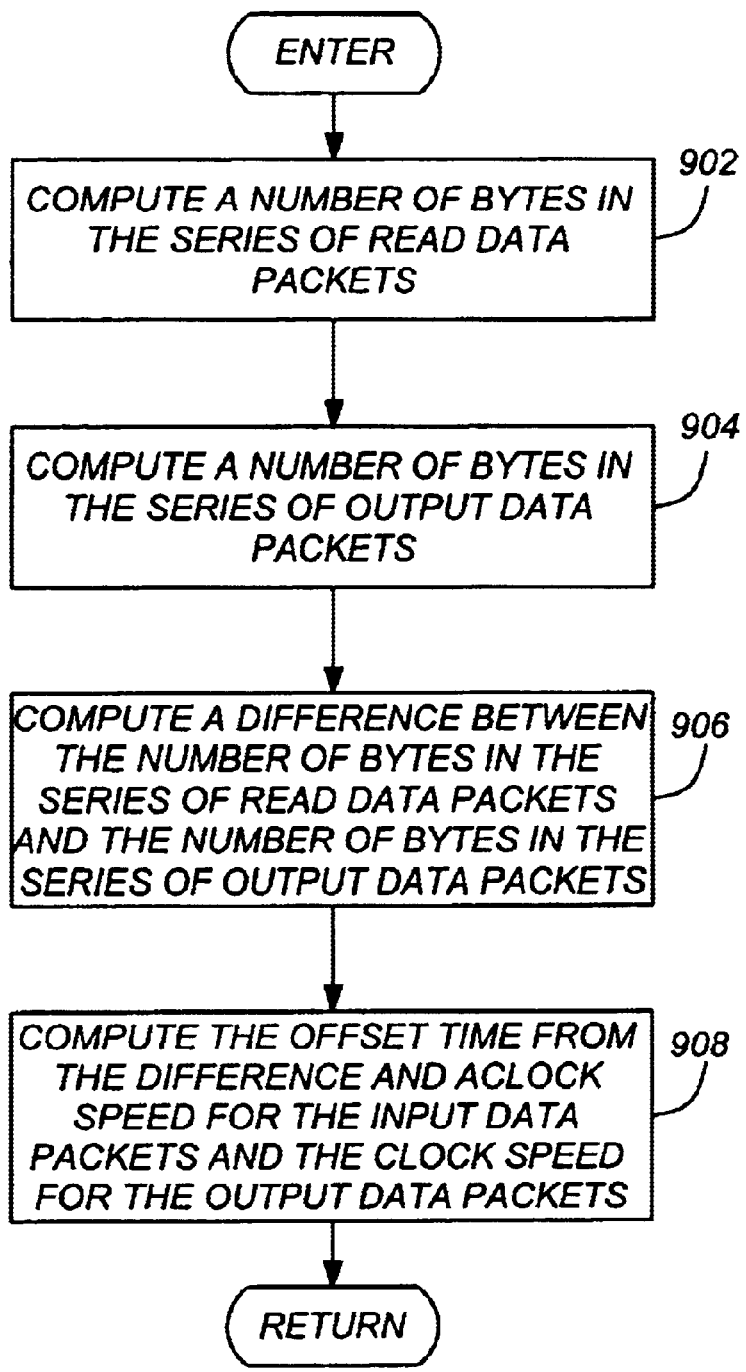
FIG. 9 is a block diagram showing one embodiment of how an offset time can be computed.

FIG. 9 is a block diagram showing one embodiment of how the offset time can be computed. As shown in block 902, a number of bytes in the series of read data packets in the input or first signal 252 is computed. Then, a number of bytes in the series of output data packets in the second signal 256 is computed. A difference between the number of bytes in the input signal 252 and the output signal 256 is computed, and the offset time is computed using this difference, as shown in blocks 906 and 908.

This can be accomplished by determining a product of the number of bytes or bits in the input data packets and the clock speed for the input data packets, determining a product of the number of bits or bytes in the output data packets and the clock speed for the output data packets, and determining the difference between these two values.

This can also be accomplished by a "ledger" method in which a counter is incremented for each byte or other data unit is received at the translator 254, and the same counter is decremented for each byte or other data unit provided as an output from the translator 254. When the counter is positive, the average input data rate has exceeded the average output data rate (during the time interval since the counter was last initialized). The counter can be divided by the data rate to compute the offset time.

Returning to FIG. 8, the offset time is then added to the first time base to produce the second time base. This is shown in block 806. Hence, $$\text{Second time base} = \{(PCR1 \times 300) + PCR2\} + \text{Offset.} \quad \text{Equation (2)}$$

Second synchronization data can be computed from the second time base (e.g. by dividing the second time base by the clock speed in the second data format). Second synchronization data can also be based on bit or packet times as well. Finally, if necessary, bits of the resulting second synchronization data can be truncated as required. This is shown in block 810. Typically, the most significant bits of the synchronization are truncated, since they are not required to reconstruct data packets into the program material. In the MPEG-2 to DIRECTV translation example described above, the most significant bits of the second time base are truncated to produce a 32 bit number consistent with the 32-bit 27 MHz DIRECTV RTS in the format, as shown in block 810.

Typically, the first signal 252 provided by the coded video source is produced by a high quality encoder. Consequently, one would expect that the first signal 252 provided by the coded video source 250 would be jitter-free. Jitter includes deviations in values related to the data stream from the expected value. Jitter can include for example, clock deviations that vary from a mean value over time. Unfortunately, this is not the case. Although most encoders perform better than required, the MPEG specification allows for a substantial amount of jitter.

As described above, if the output frequency of the data stream is known precisely, the proper value for each increment in the second time base (and hence, the second synchronization data) can be computed from the number of output packets that have been provided. If the output clock is locked to the input clock, the frequency of the first signal 252 and the second signal 256 should be substantially the same, and any variations between the two can be determined from the input-to-output phase lock loop (PLL) signal and the input clock frequency. However, if the second signal 256 is free-running with respect to the input, this is not the case.

One embodiment of the present invention minimizes jitter effects. This is accomplished by computing a predicted time base and combining it with the measured time base. The predicted time base can be computed as a preceding computed time base added to a delta time base that is computed from the number of output packets that have been released by the translator 254 since the preceding time base multiplied by the number of output clock cycles per output transport packet. Hence, the predicted time base is computed according to Equation (3) below:

$$RTS_P = RTS^{-1} + (N_P \times S_P \times f_{clock}) \quad \text{Equation (3)}$$

Wherein $RTS_P$ is the predicted time base value at the translator 254 output, $RTS^{-1}$ is the most recent RTS computed for the output data stream computed according to Equation (4), $N_P$ is the number of output packets since the preceding time base value $RTS^{-1}$, $S_P$ is the size of the output packets, and $f_{clock}$ is the clock speed of the output packets. The second time base can then be computed from the relation described in Equation (4) below:

$$RTS = [(1-K) \times RTS_P] + (K \times RTS_A) \quad \text{Equation (4)}$$

where $RTS_A$ is the most recent translated time base (e.g. derived from Equation (2)) entering the filtering process, and K is a mixture ratio that varies from zero to one, inclusive. As K approaches zero, the output time base value is weighted toward the predicted value, and as K approaches one, the output time base value approaches the "measured" output time base value.

In some cases, the input data signal 252, may include additional synchronization information that is used to assemble the payload data of a plurality of data packets into presentable program material. For example, in addition to the PCR values contained in the adaptation fields, the MPEG-2 specification also defines a PTS and/or DTS value in the PES header as well as the PCR values contained in the adaptation fields. The PTS/DTS values are required to handle processing of MPEG I-frame and B-frame data. I-frame data provides anchoring baseline data for subsequent frames. B-frame data includes information reflecting the difference between the current frame and an preceding or subsequent frames.

The MPEG decoder 514 uses the communicatively coupled video RAM 436 (which is typically 2 megabytes in size) to store incoming data packets. The time synchronization information within these packets is then examined to determine the order in which the data packets should be assembled. The PCR information provides time synchronization which is suitable for assembling groups of data packets, but is typically insufficient for assembling frames of video data. The PTS/DTS values in the PES headers, however, are useful for this purpose. The PTS/DTS and PCR information can also be used to determine how full the video RAM 436 or other buffer is with video data, to trigger alternate processing if necessary.

In cases where the first 252 signal includes additional synchronization information, (as indicated, for example, by the a PES start code) that synchronization information is also altered to conform to the format of second signal 256. Typically, this is accomplished by multiplying the additional synchronization information by a number suitable to translate the information to the clock speed of the second (output) signal 256. In the case of a translation from an MPEG-2 transport format to a DIRECTV compatible format, this can be implemented by multiplying the PTS/DTS value in the PES header by 300, thus translating the value from a 90 MHz clock to a 27 MHz clock. If the first signal's 252 additional synchronization information if of a different size than required by the format of the second signal 256, the most (or least) significant bits of the data can be discarded. In the MPEG-2 to DIRECTV example, this would amount to retaining only the lowest significant 32 bits. The number can now be multiplied by a suitable factor to produce the translated PTS/DTS number. For example, where the translation is from a 90 KHz MPEG-2 signal to a 28 MHz signal used in the DIRECTV compatible format, a suitable factor is 300.

Returning to FIG. 5, the second signal 256 having at least one output data packet in the second format is generated, as shown in block 510. In some embodiments of the present invention, data packets having synchronization information may also comprise payload data as well. Block 512 determines if payload data is also present in the data packets identified in blocks 504 and 506. If no payload data is present, the packets are assembled and provided as the output signal 256. If, as determined by block 512 payload, data is present in the data packet having synchronization data, an output data packet having the payload data is assembled in the second format.

Also as indicated in FIG. 5, data from data packets that do not contain synchronization information (as determined by block 506) are examined to find those packets with payload data, as shown in block 514. Those with payload are used to assemble output data packets in the second output format having the payload data.

Figure 10:
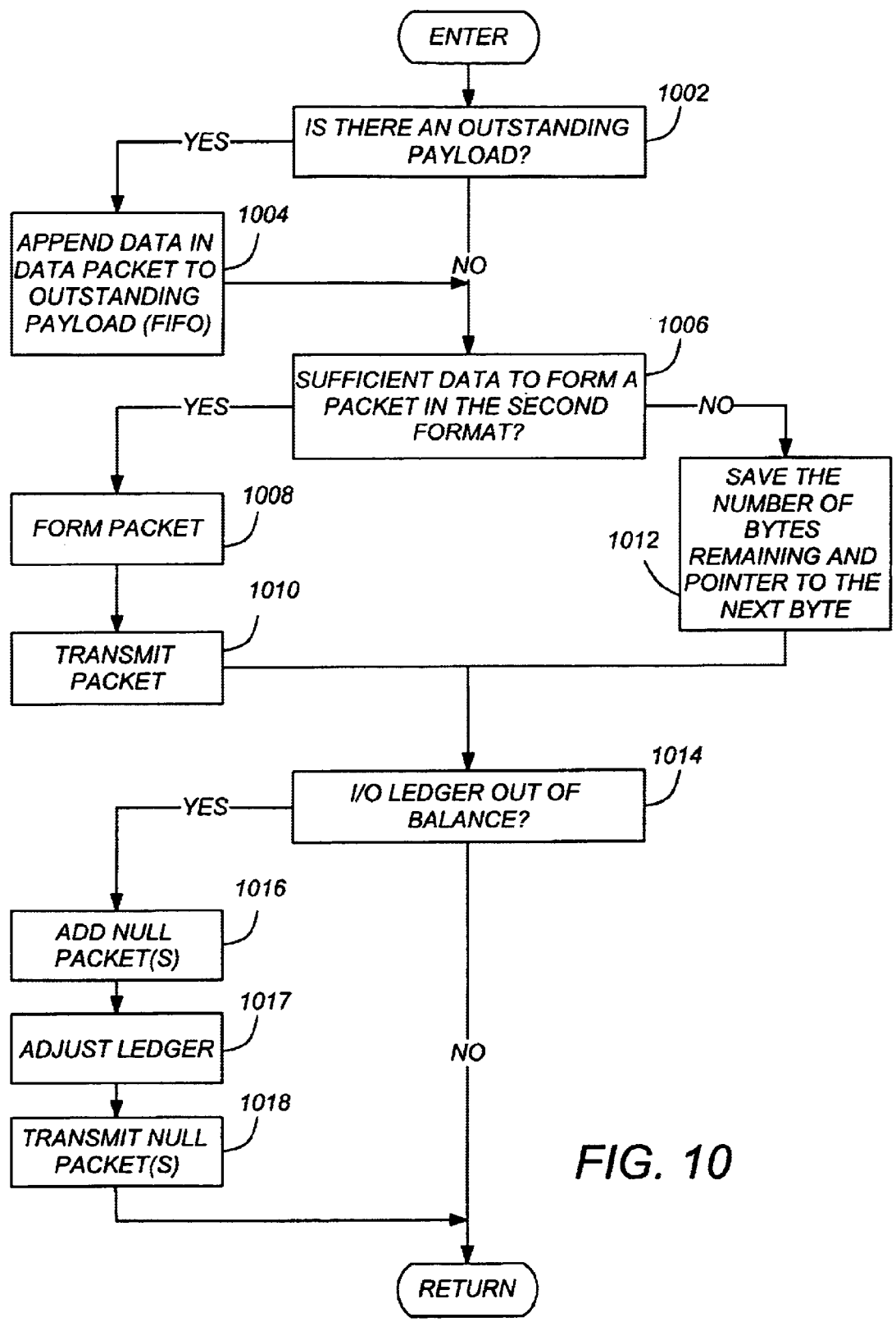
FIG. 10 is a flow chart illustrating exemplary method steps used to assemble output data packets in the second format.

FIG. 10 is a flow chart illustrating exemplary method steps used to assemble output data packets in the second format. The flow charts illustrate a method by which data packets having payloads from of one size can be transformed into data packets having payloads of another size. For example, the MPEG-2 standard specifies 188 byte data packets, while the DIRECTV standard specifies 130 byte packets. One technique of dealing with this difference in packet size is to simply translate each MPEG-2 data packet into a complete 130-byte DIRECTV packet and second DIRECTV packet with 58 bytes of data and 72 bytes of null data. This technique, however, results in the transmission o excessive null data. Another technique is to retain the 58 bytes of data outstanding from the previous data packet and to transmit that 58 bytes with the next data packet transmitted. The flow chart presented in FIG. 10 shows one way to implement this second technique.

Payload data is to be packetized and transmitted. Block 1002 determines if there is an outstanding payload. If not, processing continues at block 1006. If so, the payload data is added to the outstanding payload, as shown in block 1004. In one embodiment, this is accomplished in a first-in first-out (FIFO) fashion, so the payload data is appended to the outstanding payload. After this operation is complete, block 1006 determines if there is sufficient data to form a second packet in the second format. In the MPEG-2/DIRECTV example discussed previously, this determination considers whether the payload data (perhaps appended to the outstanding payload data as shown in block 1004) to be packetized is at least 130 bytes (with overhead).

If there is sufficient data to form a packet in the second format, the packet is formed and transmitted, as shown in blocks 1006–1010. If not (e.g. fewer than 127 bytes are available for transmission), the number of bytes remaining, and a pointer to the first unsent byte is saved, as shown in block 1012. These remaining bytes become "outstanding data" and will be sent with the next payload packet. Next, a check is made to determine if the number bytes received in the input data packets of the first signal 252 exceed the number of bytes in the transmitted output data packets in the output signal 256. In one embodiment, this is implemented by examining an I/O ledger comparing the number of bytes in the input data packets and the number of bytes in the output data packets. If the difference in the rate of input data (computed, for example, from the input clock rate and the number of input data units—e.g. bytes/bits/packets—) and the rate of output data (computed, for example, from the output clock rate and the number of output data units) exceeds a threshold amount, null packets are added to the output data stream, the ledger is adjusted, and the result is transmitted, as shown in blocks 1016–1018.

In one embodiment of the present invention, only full null packets are generated, and packets having payload data are not padded with null data or zeros. However, packets having payload data can be padded with zeros where the data packet input/output format allows insertion of such null data. For example, MPEG-2 includes padding fields between synchronization information, but does not allow null characters to be simply appended to data packets.

Hardware Environment

Figure 11:
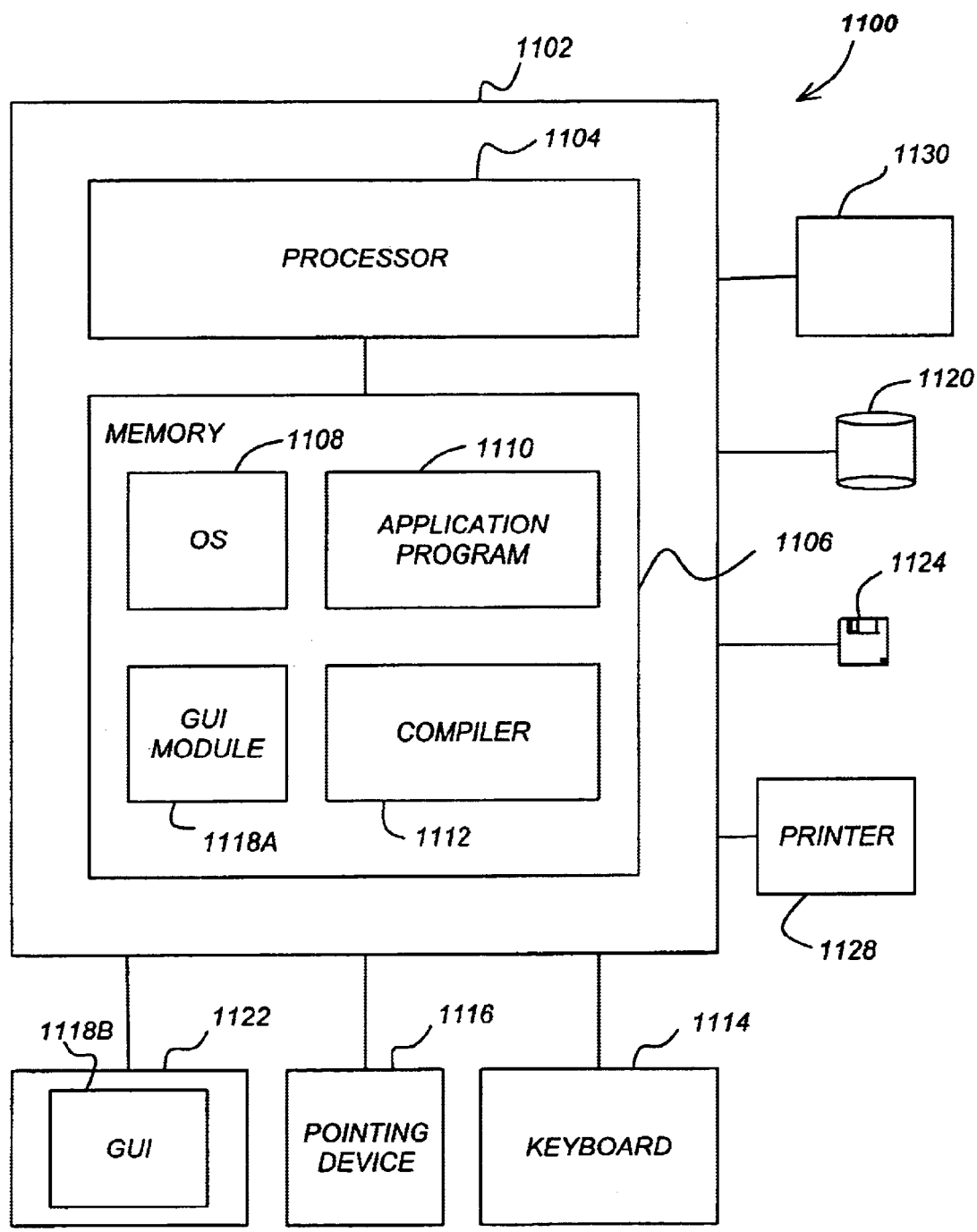
FIG. 11 illustrates an exemplary computer system that cold be used to implement that translator.

FIG. 11 illustrates an exemplary computer system 1100 that could be used to implement the translator 254. The computer 1102 comprises a processor 1104 and a memory, such as random access memory (RAM) 1106. The computer 1102 is operatively coupled to a display 1122, which presents images such as windows to the user on a graphical user interface 1118B. The computer 1102 may be coupled to other devices, such as a keyboard 1114, a mouse device 1116, a printer, etc. Of course, those skilled in the art will recognize that any combination of the above components, or any number of different components, peripherals, and other devices, may be used with the computer 1102.

Generally, the computer 1102 operates under control of an operating system 1108 stored in the memory 1106, and interfaces with the user to accept inputs and commands and to present results through a graphical user interface (GUI) module 1118A. Although the GUI module 1118A is depicted as a separate module, the instructions performing the GUI functions can be resident or distributed in the operating system 1108, the computer program 1110, or implemented with special purpose memory and processors. The computer 1102 also implements a compiler 1112 which allows an application program 1110 written in a programming language such as COBOL, C++, FORTRAN, or other language to be translated into processor 1104 readable code. After completion, the application 1110 accesses and manipulates data stored in the memory 1106 of the computer 1102 using the relationships and logic that was generated using the compiler 1112. The computer 1102 also optionally comprises an external communication device such as a modem, satellite link, Ethernet card, or other device for communicating with other computers.

In one embodiment, instructions implementing the operating system 108, the computer program 1110, and the compiler 1112 are tangibly embodied in a computer-readable medium, e.g., data storage device 1120, which could include one or more fixed or removable data storage devices, such as a zip drive, floppy disc drive 1124, hard drive, CD-ROM drive, tape drive, etc. Further, the operating system 1108 and the computer program 1110 are comprised of instructions which, when read and executed by the computer 1102, causes the computer 1102 to perform the steps necessary to implement and/or use the present invention. Computer program 1110 and/or operating instructions may also be tangibly embodied in memory 1106 and/or data communications devices 1130, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that the foregoing can be implemented with a plurality of computers or processors. Further, the present invention can be implemented by special purpose hardware processors designed to perform the required data manipulation tasks. The scope of the invention and the claims appended hereto includes such embodiments.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of translating a least one of a series of input data packets from an input format to at least one output data packet in an output format, comprising the steps of:

(a) reading the series of input data packets in the input format, the data packets including a data type identifier, wherein at least some of the input data packets include first time synchronization data and at least some of the input data packets include payload data;

(b) identifying data packets of interest in the series of input data packets according to data type using the data type identifier;

(c) identifying data packets from the data packets of interest having first time synchronization information as synchronization packets;

(d) generating second time synchronization information from the first time synchronization information; and (e) generating at least one output data packet in the output format having the second time synchronization information.

2. The method of claim 1, wherein the data type identifier includes a packet ID, and the step of identifying data packets of interest comprises the steps of:

comparing the packet ID of each of the series of input data packets with a stored value; and identifying the data packet as a data packet of interest if the packet ID matches the stored value.

3. The method of claim 1, wherein the series of input data packets are MPEG compliant and the step of identifying data packets from the data packets of interest having time synchronization information as synchronization packets comprises the step of:

identifying each packet from the data packets of interest as a synchronization packet if the data packet includes an adaptation field.

4. The method of claim 3, further comprising the step of:

determining if the adaptation field includes a program clock reference (PCR) value.

5. The method of claim 1, wherein the step of generating second time synchronization information from the first time synchronization information for the data packets having time synchronization information comprises the steps of:

computing a first time base from the first time synchronization information;

computing an offset time at least in part from a difference between a number of bytes in the series of read data packets and a number of bytes in a series of output data packets comprising the at least one output data packet adding the offset time to the first time base to produce a second time base; and generating the second synchronization data comprising a second time base.

6. The method of claim 5, further comprising the step of truncating the second synchronization data.

7. The method of claim 6, wherein the second synchronization data is truncated to eliminate a number of most significant bits of the second synchronization data.

8. The method of claim 6, wherein the second synchronization data is truncated to eliminate a number of least significant bits of the second synchronization data.

9. The method of claim 5, wherein the step of computing the offset time comprises the steps of:

computing a number of bytes in the series of read data packets;

computing a number of bytes in the series of output data packets;

computing the difference between the number of bytes in the series of read data packets and the number of bytes in the series of output data packets; and computing the offset time from the difference between the number of bytes in the series of read data packets and the number of bytes in the series of output data packets and a clock speed for the input data packets and a second clock speed for the output data packets.

10. The method of claim 5, further comprising the steps of:

computing a predicted time base; and computing a filtered time base from the predicted time base and the second time base.

11. The method of claim 10, wherein the step of computing a filtered time base from the predicted time base and the second time base comprises the step of:

computing $RTS = ((1-K) \times RTS_P + (K \times RTS_A))$ wherein RTS is the filtered time base, $RTS_P$ is the predicted time base, and K is a value between 0 and 1 inclusive, and $RTS_A$ is the second time base.

12. The method of claim 11, wherein the predicted time base is computed according to:

$$RTS_P = RTS_{-1} + (N_P \times S_{OP}) \times f_{OP};$$

and wherein $RTS_P$ is the predicted time base, $RTS_{-1}$ is a preceding filtered time base, $N_P$ is the number of output data packets assembled since the preceding second time base, $S_{OP}$ is the size of the output data packets assembled since the preceding second time base, and $f_{OP}$ is the clock speed for the output data packets assembled since the preceding second time base.

13. The method of claim 1, further comprising the steps of:

(f) identifying data packets from the data packets of interest having payload data as payload packets; and (g) assembling at least one output data packet in the output format having the payload data.

14. The method of claim 13, wherein the step of assembling at least one data packet in the output format having the payload information comprises the steps of:

determining if the payload data is of sufficient size to form an output data packet in the output format;

if the payload data is of sufficient size to form an output data packet in the output format, forming an output data packet from the payload data;

if the payload data is of insufficient size to form an output data packet in the output format, performing the steps of:

storing the payload data of insufficient size as outstanding data;

saving information sufficient to address the payload data of insufficient size.

15. The method of claim 14, wherein the information sufficient to address the payload data of insufficient size comprises a number of bytes of the payload data and a pointer to the payload data.

16. The method of claim 14, further comprising the steps of:

determining if there is outstanding payload data; and appending the payload data to the outstanding payload data.

17. The method of claim 14, further comprising the steps of:

determining if a difference between a number of bytes in the series of read data packets and a number of bytes in a series of output data packets comprising the at least one output data packet exceeds a threshold;

adding a null packet to the output data packets if the difference exceeds the threshold.

18. An apparatus for translating at least one of a series of input data packets from an input format to at least one output data packet in a output format, comprising:

a receiver for accepting the series of input data packets in the input format, the data packets including a data type identifier, wherein at least some of the data packets include first time synchronization data and at least some of the data packets include payload data;

a translator, comprising a processor, communicatively coupled to the receiver, the processor for performing instructions;

a memory, communicatively coupled to the processor, the memory storing instructions comprising:

a first instruction set to identify data packets of interest in the series of data packets according to the data type identifier;

a second instruction set to identify data packets from the data packets of interest having time synchronization information;

a third instruction set to generate second time synchronization information from the first time synchronization information for the data packets having first time synchronization information; and a fourth instruction set to generate at least one output data packet in the output format having the second time synchronization information.

19. The apparatus of claim 18, wherein the data type identifier includes a packet ID, and the first instruction set includes instructions to compare the packet ID of each of the series of data packets with a stored value and to identify the data packet as a data packet of interest if the packet ID matches the stored value.

20. The apparatus of claim 18, wherein the series of data packets are MPEG compliant and the second instruction set includes instructions to identify each packet from the data packets of interest as a synchronization packet if the data packet includes an adaptation field.

21. The apparatus of claim 20, wherein the third instruction set further comprises:

instructions to compute a first time base from the first time synchronization information;

instructions to compute an offset time at least in part from a difference between a number of bytes in the series of read data packets and a number of bytes in a series of output data packets comprising the at least one output data packet;

instructions to add the offset time to the first time base to produce a second time base; and instructions to generate the second synchronization data comprising the second time base.

22. The apparatus of claim 21, wherein the third instruction set further comprises instructions to truncate the second synchronization data.

23. The apparatus of claim 22, wherein a number of most significant bits of the second synchronization data are truncated.

24. The apparatus of claim 22, wherein a number of least significant bits of the second synchronization data are truncated.

25. The apparatus of claim 21, wherein the instructions to compute an offset time include:

instructions to compute a number of bytes in the series of read data packets;

instructions to compute a number of bytes in the series of output data packets; and instructions to compute the difference between the number of bytes in the series of read data packets and the number of bytes in the series of output data packets.

26. The apparatus of claim 21, further comprising instructions to compute a predicted time base and to compute a filtered time base from the predicted time base and the second time base.

27. The apparatus of claim 26, wherein the filtered time base is computed according to $RTS=((1-K) \times RTS_P + (K \times RTS_A))$, wherein RTS is the filtered time base, $RTS_P$ is the predicted time base, and K is a value between 0 and 1 inclusive, and $RTS_A$ is the second time base.

28. The apparatus of claim 27, wherein the predicted time base is computed according to:

$$RTS_P = RTS_{-1} + (N_P \times S_{OP}) \times f_{OP};$$

and wherein $RTS_P$ is the predicted time base, $RTS_{-1}$ is a preceding filtered time base, $N_P$ is the number of output data packets assembled since the preceding second time base, $S_{)P}$ is the size of the output data packets assembled since the preceding second time base, and $f_{OP}$ is the clock speed for the output data packets assembled since the preceding second time base.

29. The apparatus of claim 18, wherein the stored instructions further comprise:

an fifth instruction set to identify payload packets from the data packets of interest, the payload packets having payload data; and a sixth instruction set to assemble at least one output data packet in the output format having the payload data.

30. The apparatus of claim 17, wherein the sixth instruction set to assemble at least one output data packet in the output format having the payload data comprises:

instructions to determine if the payload data is of sufficient size to form an output data packet in the output format;

instructions to form an output data packet from the payload data if the payload data is of sufficient size to form an output data packet in the output format;

instructions to stored the payload data of insufficient size as outstanding data and to save information sufficient to address the payload data of insufficient size if the payload data is of insufficient size to form an output data packet in the output format.

31. The apparatus of claim 30, wherein the information sufficient to address the payload data of insufficient size comprises a number of bytes of the payload data and a pointer to the payload data.

32. The apparatus of claim 30, wherein the instructions further comprise instructions to determine if there is outstanding payload data and to append the payload data to the outstanding payload data.

33. The apparatus of claim 30, wherein the instructions further comprise instructions to determine if a difference between an number of bytes in the series of read data packets and a number of bytes in a series of output data packets comprising the at least one output data packet exceeds a threshold and to add a null packet to the output data packets if the difference exceeds a threshold.

34. An apparatus for translating at least one of a series of input data packets from an input format to at least one output data packet in a output format, comprising:
   a receiver for accepting the series of input data packets in the input format, the data packets including a data type identifier, wherein at least some of the data packets include first time synchronization data and at least some of the data packets include payload data;
   a first processor identifying data packets of interest in the series of input data packets according to data type using the data type identifier;
   a second processor identifying time synchronization packets from the data packets of interest, wherein the time synchronization packets have first time synchronization information;
   a third processor generating second time synchronization information from the first time synchronization information; and
   a fourth processor generating at least one output data packet in the output format having the second time synchronization information.

35. An apparatus for translating at least one of a series of input data packets from an input format to at least one output data packet in a output format, comprising:
   means for reading the series of input data packets in the input format, the data packets including a data type identifier, wherein at least some of the data packets include first time synchronization data and at least some of the data packets include payload data;
   means for identifying data packets of interest in the series of data packets according to data type using the data type identifier;
   means for identifying data packets from the data packets of interest having first time synchronization information as synchronization packets;
   means for generating second time synchronization information from the first time synchronization information; and
   means for generating at least one output data packet in the output format having the second time synchronization information.

36. The apparatus of claim 35, wherein the data type identifier includes a packet ID, and the means for identifying data packets of interest comprises:
   means for comparing the packet ID of each of the series of data packets with a stored value; and
   means for identifying the data packet as a data packet of interest if the packet ID matches the stored value.

37. The apparatus of claim 35, wherein the series of data packets are MPEG compliant and the means for identifying data packets from the data packets of interest having time synchronization information as synchronization packets comprises:
   means for identifying each packet from the data packets of interest as a synchronization packet if the data packet includes an adaptation field.

38. The apparatus of claim 37, further comprising:
   means for determining if the adaptation field includes a program clock reference (PCR) value.

39. The apparatus of claim 35, wherein the means for generating second time synchronization information from the first time synchronization information for the data packets having time synchronization information comprises:
   means for computing a first time base from the first time synchronization information;
   means for computing an offset time at least in part from a difference between a number of bytes in the series of read data packets and a number of bytes in a series of output data packets comprising the at least one output data packet;
   means for adding the offset time to the first time base to produce a second time base; and
   means for generating the second synchronization data comprising a second time base.

40. The apparatus of claim 39, further comprising means for truncating the second synchronization data.

41. The apparatus of claim 40, wherein the second synchronization data is truncated to eliminate a number of most significant bits of the second synchronization data.

42. The apparatus of claim 40, wherein the second synchronization data is truncated to eliminate a number of least significant bits of the second synchronization data.

43. The apparatus of claim 39, wherein the means for computing the offset time comprises:
   means for computing a number of bytes in the series of read data packets;
   means for computing a number of bytes in the series of output data packets;
   means for computing the difference between the number of bytes in the series of read data packets and the number of bytes in the series of output data packets; and
   means for computing the offset time from the difference between the number of bytes in the series of read data packets and the number of bytes in the series of output data packets and a clock speed for the input data packets and a second clock speed for the output data packets.

44. The apparatus of claim 39, further comprising:
   means for computing a predicted time base; and
   means for computing a filtered time base from the predicted time base and the second time base.

45. The apparatus of claim 44 wherein the means for computing a filtered time base from the predicted time base and the second time base comprises:
   means for computing $RTS = ((1-K) - RTS_P + (K \times RTS_A))$
   wherein RTS is the filtered time base, $RTS_P$ is the predicted time base, and K is a value between 0 and 1 inclusive, and $RTS_A$ is the second time base.

46. The apparatus of claim 45, wherein the predicted time base is computed according to:

$$RTS_P = RTS_{-1} + (N_P \times S_{OP}) \times f_{OP};$$

and wherein $RTS_P$ is the predicted time base, $RTS_{-1}$ is a preceding filtered time base, $N_P$ is the number of output data packets assembled since the preceding second time base, $S_{OP}$ is the size of the output data packets assembled since the preceding second time base, and $f_{OP}$ is the clock speed for the output data packets assembled since the preceding second time base.

47. The apparatus of claim 35, further comprising:

means for identifying data packets from the data packets of interest having payload data as payload packets; and means for assembling at least one output data packet in the output format having the payload data.

48. The apparatus of claim 47, wherein the means for assembling at least one data packet in the output format having the payload information comprises:

means for determining if the payload data is of sufficient size to form an output data packet in the output format;

means for forming an output data packet from the payload data if the payload data is of sufficient size to form an output data packet in the output format; and means for storing the payload data of insufficient size as outstanding data and for saving information sufficient to address the payload data of insufficient size if the payload data is of insufficient size to form an output data packet in the output format.

49. The apparatus of claim 48, wherein the information sufficient to address the payload data of insufficient size comprises a number of bytes of the payload data and a pointer to the payload data.

50. The apparatus of claim 48, further comprising:

means for determining if there is outstanding payload data; and means for appending the payload data to the outstanding payload data.

51. The apparatus of claim 48, further comprising:

means for determining if a difference between a number of bytes in the series of read data packets and a number of bytes in a series of output data packets comprising the at least one output data packet exceeds a threshold; and means for adding a null packet to the output data packets if the difference exceeds the threshold.

52. A program storage device, readable by a computer, tangibly embodying at least one program of instructions executable by the computer to perform method steps of translating at least one of a series of input data packets from an input format to at least one output data packet in an output format, the method steps comprising the steps of:

(a) reading the series of input data packets in the input format, the input data packets including a data type identifier, wherein at least some of the input data packets include first time synchronization data and at least some of the input data packets include payload data;

(b) identifying data packets of interest in the series of input data packets according to data type using the data type identifier;

(c) identifying data packets from the data packets of interest having first time synchronization information as synchronization packets;

(d) generating second time synchronization information from the first time synchronization information; and (e) generating at least one output data packet in the output format having the second time synchronization information.

* * * * *